United States Patent
Berenstein et al.

(10) Patent No.: US 10,970,109 B1
(45) Date of Patent: Apr. 6, 2021

(54) SYSTEM, METHOD, AND COMPUTER PROGRAM FOR MANAGING A PLURALITY OF HETEROGENEOUS SOFTWARE ROBOTS TO AUTOMATE BUSINESS PROCESSES

(71) Applicant: Amdocs Development Limited, Limassol (CY)

(72) Inventors: Evgeni Berenstein, Ramat Gan (IL); Zeev Eisen, Hosahaya (IL); Eadan Agur, Givatayim (IL); Boris Rozenblit, Chesterfield, MO (US)

(73) Assignee: AMDOCS DEVELOPMENT LIMITED, Limassol (CY)

( * ) Notice: Subject to any disclaimer, the term of this patent is extended or adjusted under 35 U.S.C. 154(b) by 87 days.

(21) Appl. No.: 16/183,561

(22) Filed: Nov. 7, 2018

Related U.S. Application Data (60) Provisional application No. 62/584,013, filed on Nov. 9, 2017.

(51) Int. Cl.
| | | |
|---|---|---|
| G06F 9/46 | (2006.01) | |
| G06F 9/48 | (2006.01) | |
| G06F 11/30 | (2006.01) | |
| G06F 11/34 | (2006.01) | |
| G06N 20/00 | (2019.01) | |
| H04L 29/08 | (2006.01) | |

(52) U.S. Cl.
CPC ........ *G06F 9/4843* (2013.01); *G06F 11/3024* (2013.01); *G06F 11/3409* (2013.01); *G06N 20/00* (2019.01); *H04L 67/10* (2013.01)

(58) Field of Classification Search
CPC .................................................... G06F 9/4843
USPC ......................................................... 718/102
See application file for complete search history.

(56) References Cited

U.S. PATENT DOCUMENTS

| | | | |
|---|---|---|---|
| 7,085,831 B2 | 8/2006 | Larkin | |
| 8,964,958 B2 | 2/2015 | Steiner | |
| 9,531,782 B2 | 12/2016 | Shaffer et al. | |
| 2004/0205772 A1* | 10/2004 | Uszok | H04L 29/06 719/317 |
| 2008/0133210 A1* | 6/2008 | Chagoly | G06F 9/45512 703/22 |

(Continued)

FOREIGN PATENT DOCUMENTS

EP 3112965 A1 * 1/2017 ............ B25J 9/1679

OTHER PUBLICATIONS

Modi et al., "Creating Business Value Through Next-Generation Smart Digital Workforce," Everest Group Research, 2017, pp. 1-18.

*Primary Examiner* — Evral E Bodden
(74) *Attorney, Agent, or Firm* — Zilka-Kotab, P.C.

(57) ABSTRACT

A system, method, and computer program product are provided for managing a plurality of heterogeneous software robots to automate business processes. The system provides an architecture for use in forming business automation systems comprising a plurality of software robots designed to implement specific operations used for implementation of a business process spanned across multiple systems. The system also provides command and control for automation systems comprising a plurality of software agents adapted to implement specific tasks using on screen application integration, application programming interfaces (APIs), or database access to fetch or insert the required data.

14 Claims, 10 Drawing Sheets

(56) References Cited

U.S. PATENT DOCUMENTS

2019/0129827 A1\* 5/2019 Ramasamy ......... G06F 11/3664
2019/0138879 A1\* 5/2019 Hu ........................ G06N 5/043

\* cited by examiner

SYSTEM, METHOD, AND COMPUTER PROGRAM FOR MANAGING A PLURALITY OF HETEROGENEOUS SOFTWARE ROBOTS TO AUTOMATE BUSINESS PROCESSES

CLAIM OF PRIORITY AND RELATED APPLICATIONS

This application claims the benefit of U.S. Provisional Application No. 62/584,013, filed Nov. 9, 2017, the entire contents of which are incorporated herein by reference.

FIELD OF THE INVENTION

The present invention relates to software robots command and control center and is concerned in particular with a system to manage heterogeneous automation tools supporting multiple methods of applications integration (including screen, application programming interfaces, database access, etc.) required in order to implement a business process spanning multiple applications.

BACKGROUND

Most business applications are built as a standalone functionality designed to implement a specific business task. Automation robots and their control systems are designed to manage the activities of the specific robot. A conventional implementation of the robot program automation will include the robot and the associated management system that will enable configuration of the robot, triggering the scripts and monitoring of its operations.

Currently, there is no solution that enables operations of multiple robots from different vendors and multiple integration capabilities with processes implemented by multiple robots for the same business process.

There is thus a need for addressing these and/or other issues associated with the prior art.

SUMMARY

A system, method, and computer program product are provided for managing a plurality of heterogeneous software robots to automate business processes. The system provides an architecture for use in forming business automation systems comprising a plurality of software robots designed to implement specific operations used for implementation of a business process spanned across multiple systems. The system also provides command and control for automation systems comprising a plurality of software agents adapted to implement specific tasks using on screen application integration, application programming interfaces (APIs), or database access to fetch or insert the required data.

DETAILED DESCRIPTION

Figure 1:
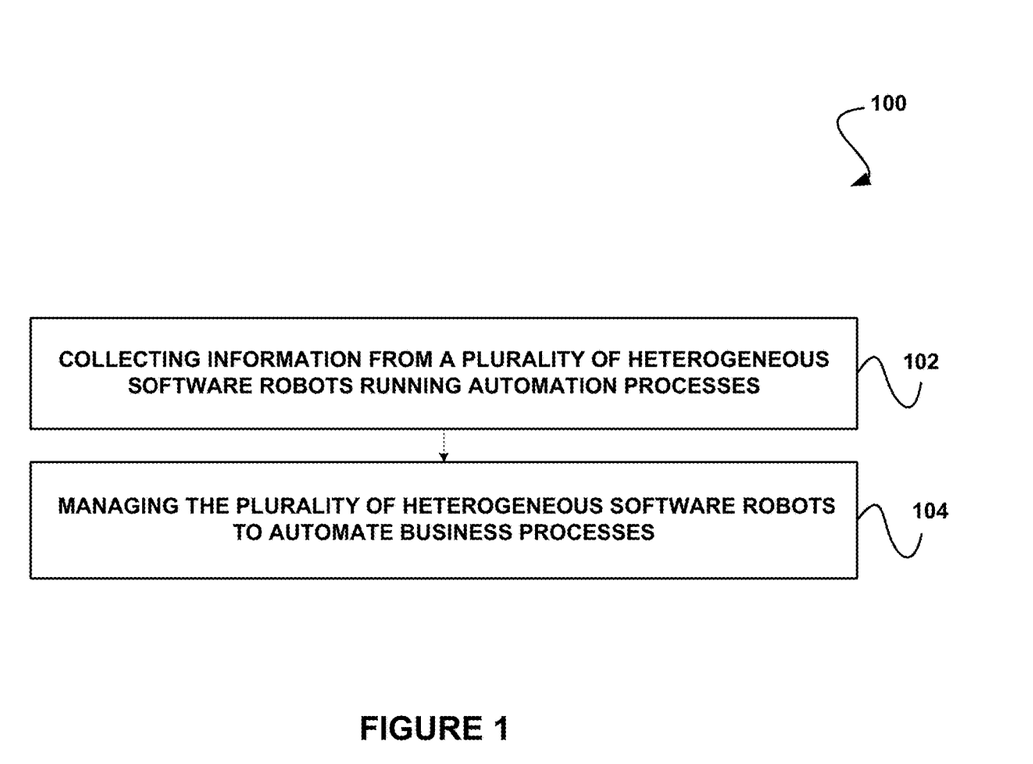
FIG. 1 illustrates a method for managing a plurality of heterogeneous software robots to automate business processes, in accordance with one embodiment.

FIG. 1 illustrates a method 100 for managing a plurality of heterogeneous software robots to automate business processes, in accordance with one embodiment.

In operation, a system collects information from a plurality of heterogeneous software robots running automation processes. See operation 102. The system manages the plurality of heterogeneous software robots utilizing the collected information to automate business processes. See operation 104.

The system includes an automation command and control architecture for managing a plurality of heterogeneous software robots to automate business processes. The system provides configuration, triggering monitoring and reporting capabilities for the robots. Additionally, the system may analyze the information from the plurality of robots running the automation processes. In this case, the system may manage the plurality of robots running the automation processes based on the analyzed information.

In one embodiment, the system may measure the load on the source/target application to prevent overloads and service failures. Further, in one embodiment, the system may enable elastic robots activation based on business needs. In addition, the system may be adapted to enable the adding of intelligent behavior using machine learning and artificial intelligence algorithms. In one embodiment, the system may be integrated with multiple channels including chat and voice.

It should be noted that the method 100 may be implemented utilizing various systems, hardware, software, applications, user interfaces, etc., as dictated by the implementer. For example, the system implementing the method 100 (e.g. the management system 204 of FIG. 2, etc.) may include one or more processors, databases, etc., as well as implement various logic, computer code, applications, and/or user interfaces, etc. In one embodiment, the system may include a system implemented on top of a big data cluster, etc.

More illustrative information will now be set forth regarding various optional architectures and uses in which the foregoing method may or may not be implemented, per the desires of the user. It should be strongly noted that the following information is set forth for illustrative purposes and should not be construed as limiting in any manner. Any of the following features may be optionally incorporated with or without the exclusion of other features described.

Figure 2:
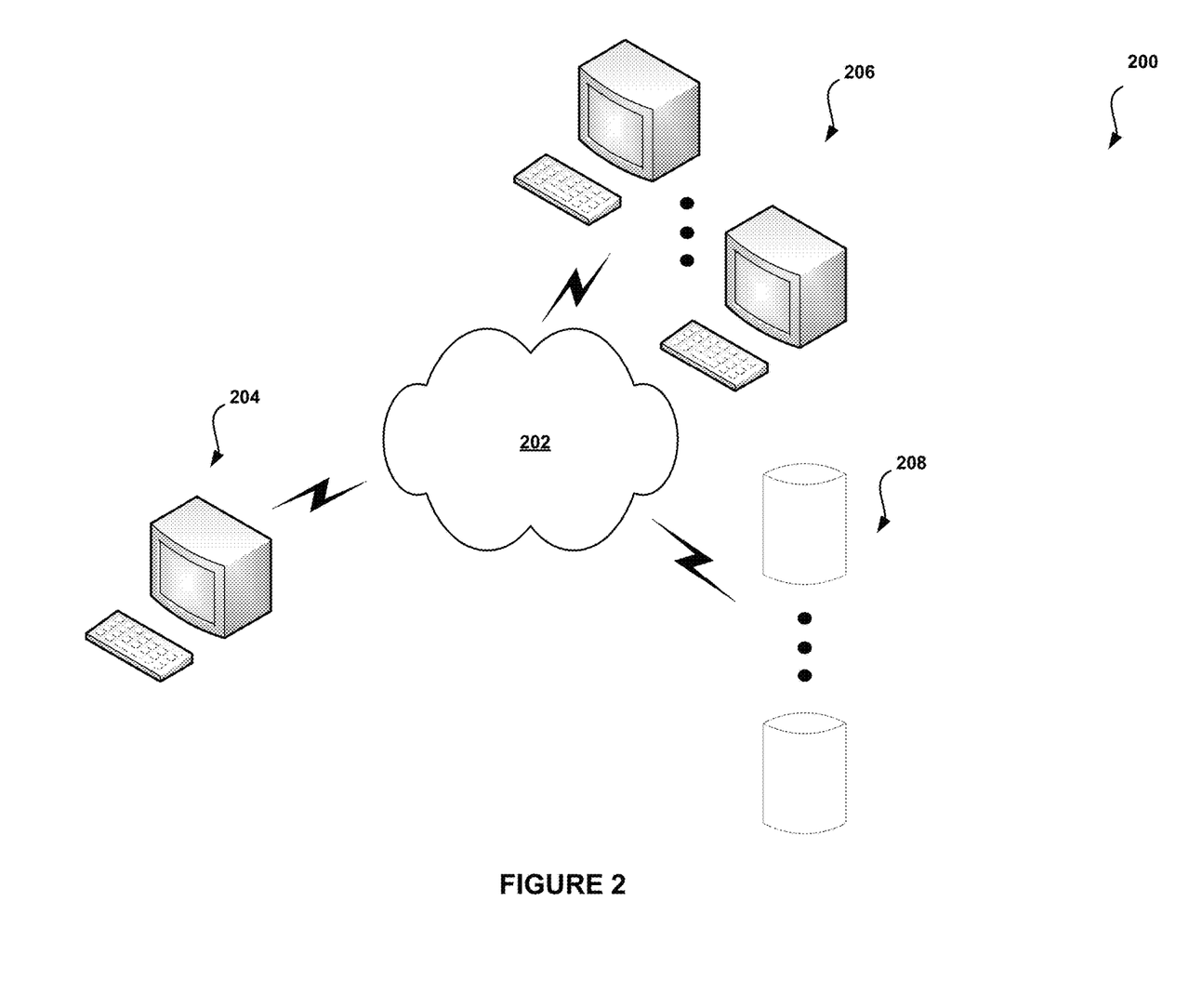
FIG. 2 shows a system for managing a plurality of heterogeneous software robots to automate business processes, in accordance with one embodiment.

FIG. 2 shows a system 200 for managing a plurality of heterogeneous software robots to automate business processes, in accordance with one embodiment. As an option, the system 200 may be implemented in the context of the details of the previous figure and/or any subsequent figure(s). Of course, however, the system 200 may be implemented in the context of any desired environment. Further, the aforementioned definitions may equally apply to the description below.

As shown, the system 200 includes a management system 204, which may implement a variety of applications or software, etc. The management system 204 may be capable of communicating with a plurality of systems 206, either directly or over one or more networks 202, for managing a plurality of heterogeneous software robots to automate business processes associated with the systems 206, etc. The management system 204 may also be in communication with one or more repositories/databases 208.

The management system 204 may be utilized for managing and controlling heterogeneous software robots. A command and control center associated with the management system 204 may be capable of managing a large number of robots (e.g. hundreds or thousands, etc.). The command and control center may enable implementation of processes using multiple robots. Additionally, the command and control center may monitor the executions of the scripts and inform systems/devices about source target systems failures. The command and control center also may ensure that the robot will not overload/stress target systems.

The command and control center may analyze the scripts and apply machine learning and artificial intelligence algorithms to improve the performance (e.g. eliminating unnecessary steps, redesign the flow, optimize the target systems loads, etc.). An automation authority associated with the management system 204 may provide governance including standard guidelines for automation script implementation and may enable massive reuse of automation scripts.

A reporting center associated with the management system 204 may deliver reports and dashboards to the relevant stake holders. An operations center associated with the management system 204 may trigger the scripts based on scheduled rules or they may be triggered by events. Manual processing may be triggered if the robots failed the mission and could not be automatically remediated.

The automation control center will be able to use the robot for multiple tasks. Additionally, the automation control center will be able to execute the same task using multiple interfaces (on screen, API, or database). Further, the automation control center may provide multiple data stores including but not limited to: a scripts repository, reporting DMs, an event sourcing repository to replay scripts, etc. The automation control center may continuously monitor performance of the robots and the target systems.

Figure 3:
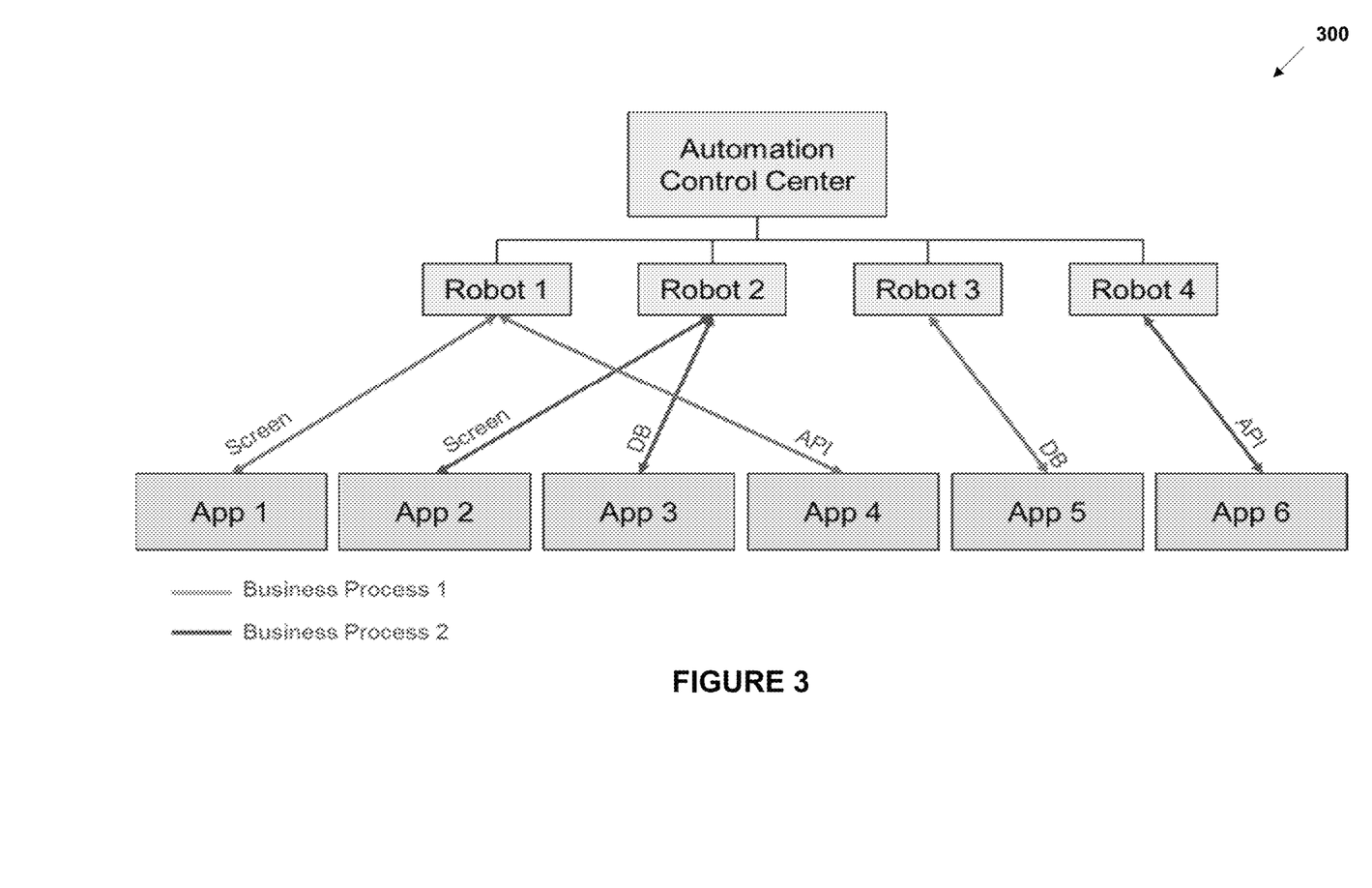
FIG. 3 shows a system flow diagram of an automation control center, in accordance with one embodiment.

FIG. 3 shows a system flow diagram 300 of an automation control center, in accordance with one embodiment. As an option, the diagram 300 may be implemented in the context of the details of the previous figures and/or any subsequent figure(s). Of course, however, the diagram 300 may be implemented in the context of any desired environment. Further, the aforementioned definitions may equally apply to the description below.

As shown, an automation control center associated with the system may manage multiple heterogeneous robots, which have access to various heterogeneous applications.

Figure 4:
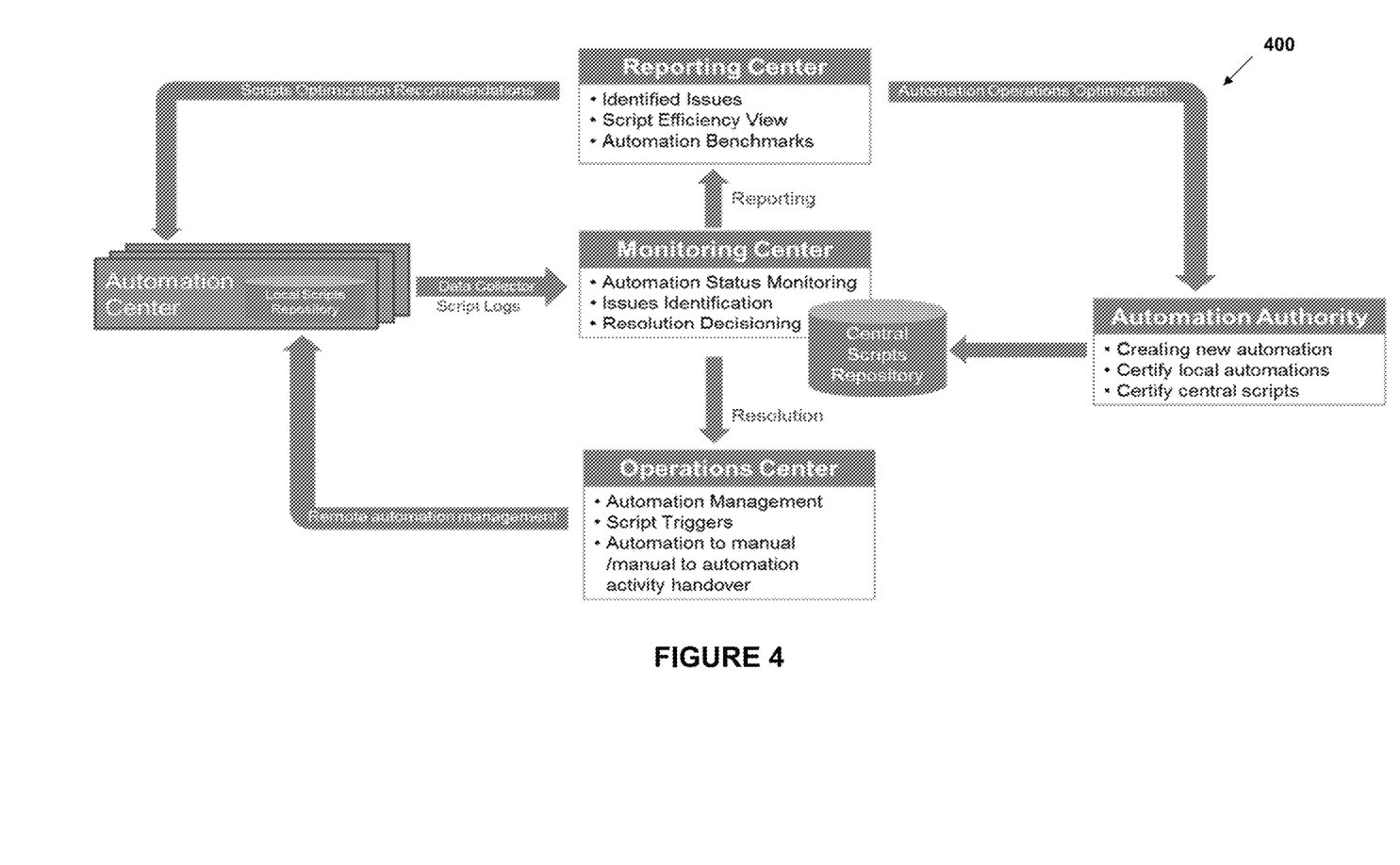
FIG. 4 shows a system flow diagram of internal components of an automation control center, in accordance with one embodiment.

FIG. 4 shows a system flow diagram 400 of internal components of an automation control center, in accordance with one embodiment. As an option, the diagram 400 may be implemented in the context of the details of the previous figures and/or any subsequent figure(s). Of course, however, the diagram 400 may be implemented in the context of any desired environment. Further, the aforementioned definitions may equally apply to the description below.

As shown, an automation center associated with the system may include a local scripts repository. A monitoring center associated with the system may perform automation status monitoring, issues identification, and make resolution decisions. An operations center associated with the system may perform automation management, initiate script triggers, and perform any automation to manual, or manual to automation, activity handover. A reporting center associated with the system may report on identified issues, script efficiency, and automation benchmarks. An automation authority associated with the system may create new automation, certify local automations, and certify central scripts.

Figure 5:
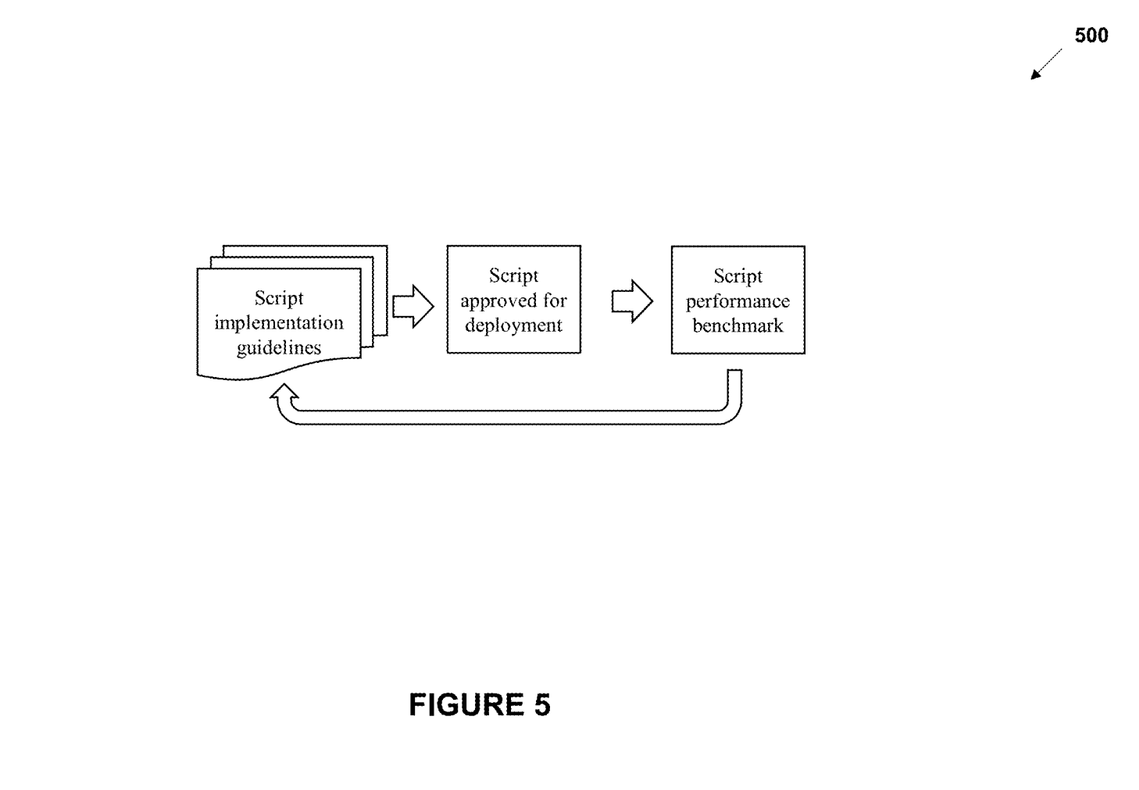
FIG. 5 shows a system flow diagram of an automation authority subsystem, in accordance with one embodiment.

FIG. 5 shows a system flow diagram 500 of an automation authority subsystem, in accordance with one embodiment. As an option, the diagram 500 may be implemented in the context of the details of the previous figures and/or any subsequent figure(s). Of course, however, the diagram 500 may be implemented in the context of any desired environment. Further, the aforementioned definitions may equally apply to the description below.

In operation, the automation authority subsystem may function to: define guidelines for scripts implementation; validate scripts and approves for deployment; and benchmark scripts load on the target systems.

Figure 6:
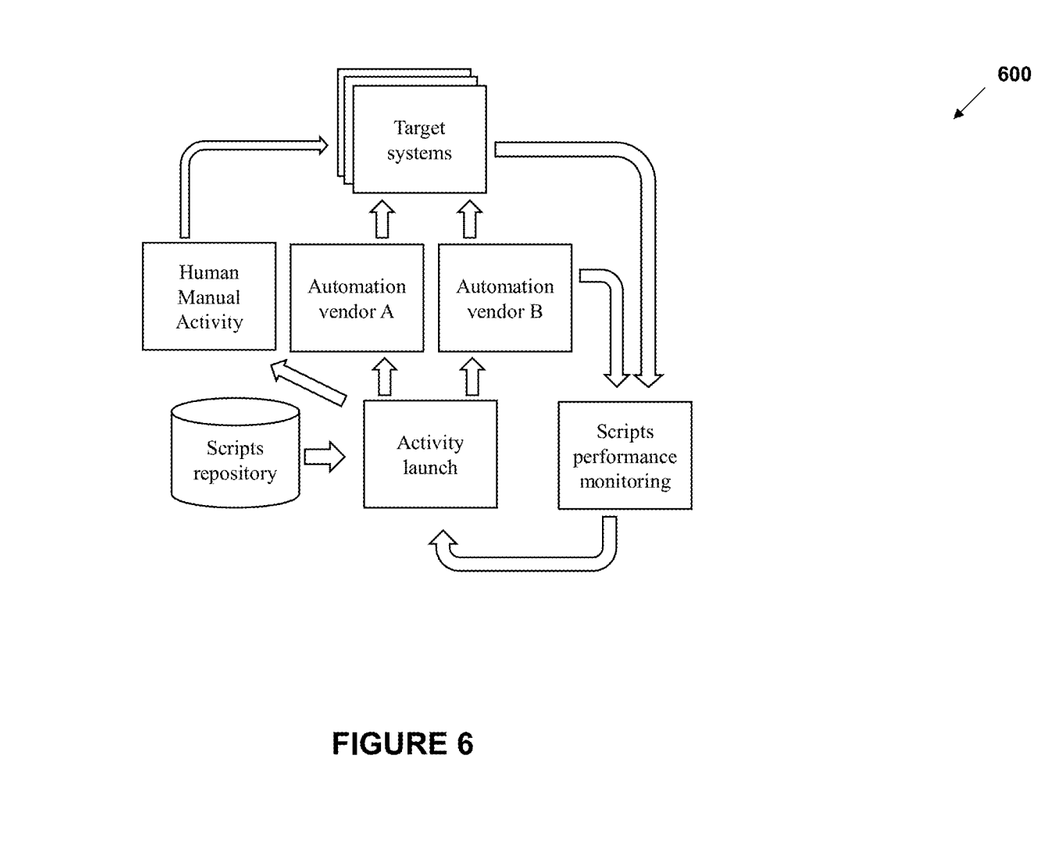
FIG. 6 shows a system flow diagram of operations center processes, in accordance with one embodiment.

FIG. 6 shows a system flow diagram 600 of operations center processes, in accordance with one embodiment. As an option, the diagram 600 may be implemented in the context of the details of the previous figures and/or any subsequent figure(s). Of course, however, the diagram 600 may be implemented in the context of any desired environment. Further, the aforementioned definitions may equally apply to the description below.

In one embodiment, the operations center processes may include: storing scripts; launching simple scripts (e.g. involving a single robot, etc.); launching complex scripts (e.g. involving more than one robot); monitoring scripts for overloading a target system; and controlling/restarting scripts or initiating human handling when they fail.

Figure 7:
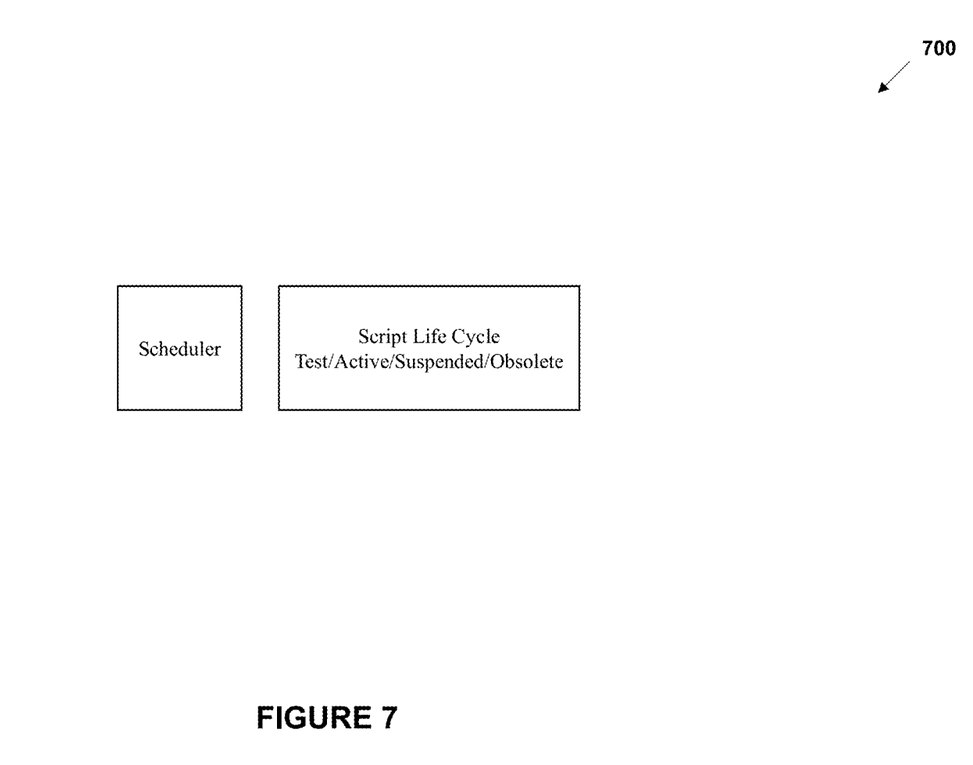
FIG. 7 shows a simplified system diagram of an automation center, in accordance with one embodiment.

FIG. 7 shows a simplified system diagram 700 of an automation center, in accordance with one embodiment. As an option, the diagram 700 may be implemented in the context of the details of the previous figures and/or any subsequent figure(s). Of course, however, the diagram 700 may be implemented in the context of any desired environment. Further, the aforementioned definitions may equally apply to the description below.

In operation, the automation center may: trigger scheduled scripts; trigger event based scripts; manage script life cycles; and assign robots for tasks (service elasticity).

Figure 8:
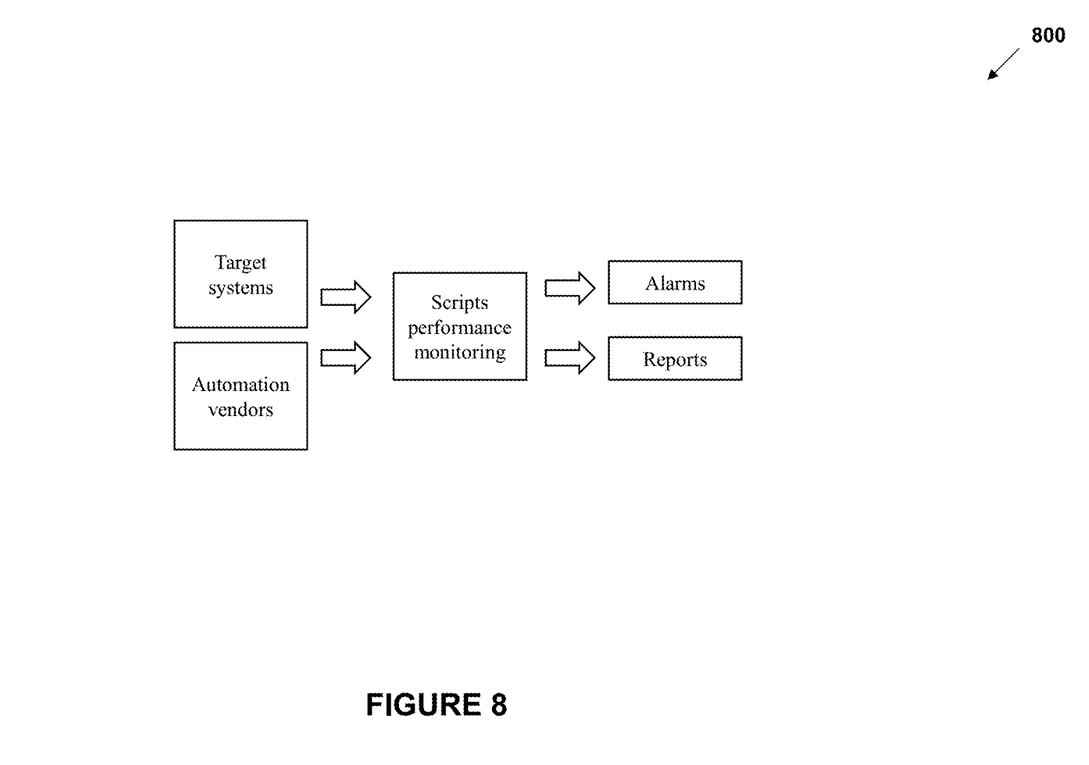
FIG. 8 shows a simplified system diagram of a monitoring center, in accordance with one embodiment.

FIG. 8 shows a simplified system diagram 800 of a monitoring center, in accordance with one embodiment. As an option, the diagram 800 may be implemented in the context of the details of the previous figures and/or any subsequent figure(s). Of course, however, the diagram 800 may be implemented in the context of any desired environment. Further, the aforementioned definitions may equally apply to the description below.

In operation, the monitoring center may function to: monitor scripts performance; trigger alarms; and generate reports about automatic/human agents' performance.

Figure 9:
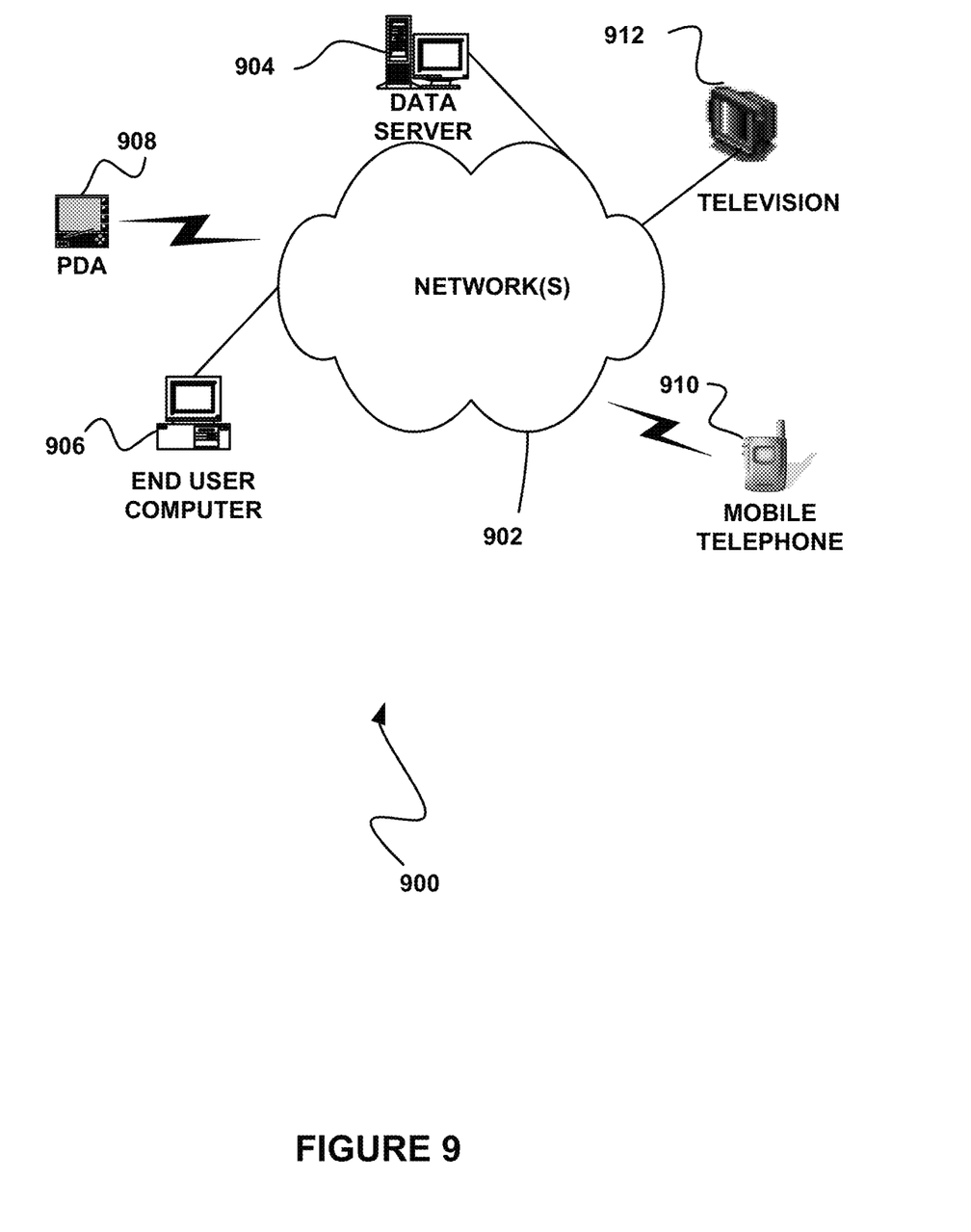
FIG. 9 illustrates a network architecture, in accordance with one possible embodiment.

FIG. 9 illustrates a network architecture 900, in accordance with one possible embodiment. As shown, at least one network 902 is provided. In the context of the present network architecture 900, the network 902 may take any form including, but not limited to a telecommunications network, a local area network (LAN), a wireless network, a wide area network (WAN) such as the Internet, peer-to-peer network, cable network, etc. While only one network is shown, it should be understood that two or more similar or different networks 902 may be provided.

Coupled to the network 902 is a plurality of devices. For example, a server computer 904 and an end user computer 906 may be coupled to the network 902 for communication purposes. Such end user computer 906 may include a desktop computer, lap-top computer, and/or any other type of logic. Still yet, various other devices may be coupled to the network 902 including a personal digital assistant (PDA) device 908, a mobile phone device 910, a television 912, Voice Assistant, and Chat Bot channels, etc.

Figure 10:
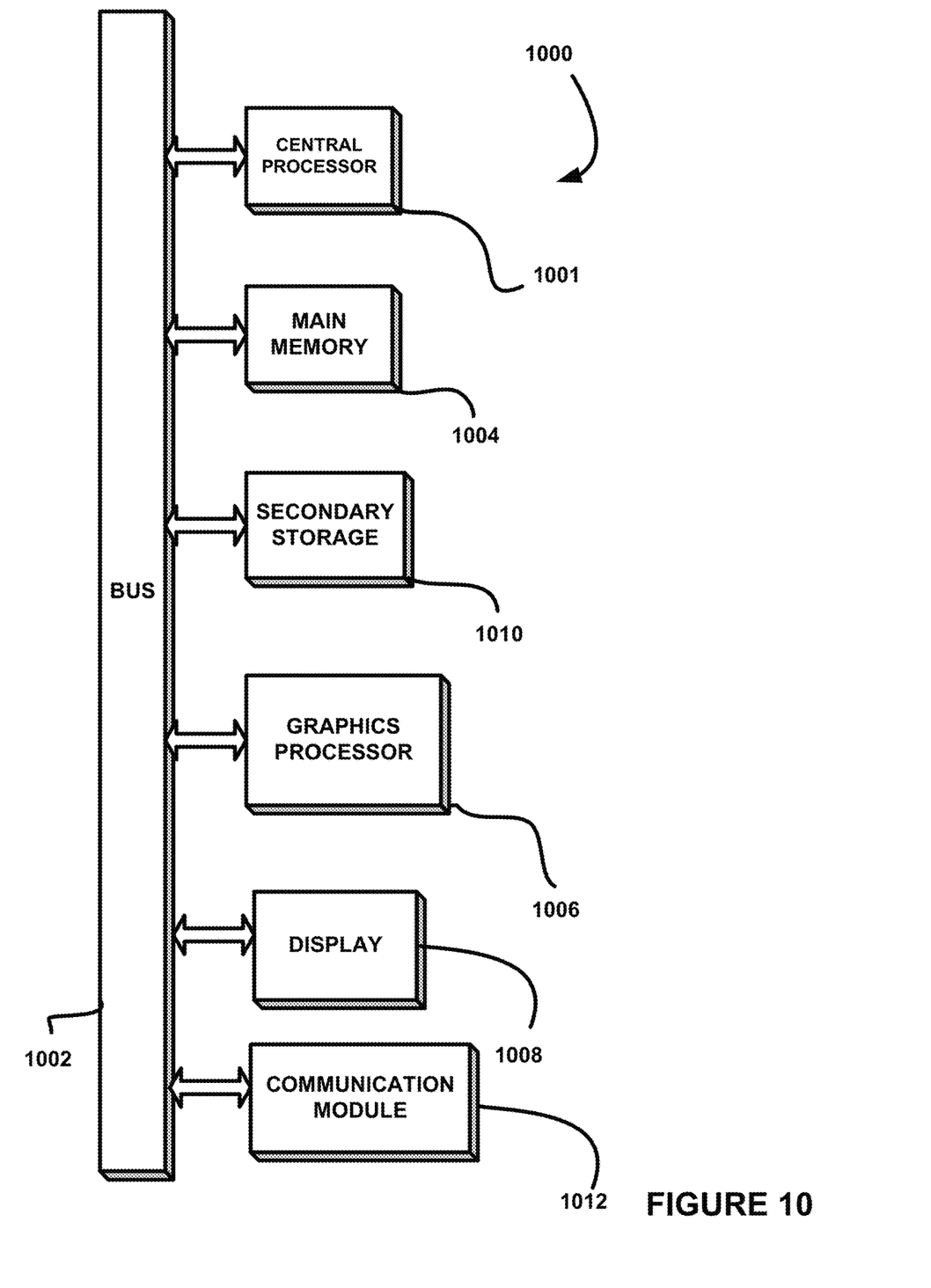
FIG. 10 illustrates an exemplary system, in accordance with one embodiment.

FIG. 10 illustrates an exemplary system 1000, in accordance with one embodiment. As an option, the system 1000 may be implemented in the context of any of the devices of the network architecture 900 of FIG. 9. Of course, the system 1000 may be implemented in any desired environment.

As shown, a system 1000 is provided including at least one central processor 1001 which is connected to a communication bus 1002. The system 1000 also includes main memory 1004 [e.g. random access memory (RAM), etc.]. The system 1000 also includes a graphics processor 1006 and a display 1008.

The system 1000 may also include a secondary storage 1010. The secondary storage 1010 includes, for example, a hard disk drive and/or a removable storage drive, representing a floppy disk drive, a magnetic tape drive, a compact disk drive, etc. The removable storage drive reads from and/or writes to a removable storage unit in a well-known manner.

Computer programs, or computer control logic algorithms, may be stored in the main memory 1004, the secondary storage 1010, and/or any other memory, for that matter. Such computer programs, when executed, enable the system 1000 to perform various functions (as set forth above, for example). Memory 1004, storage 1010 and/or any other storage are possible examples of non-transitory computer-readable media.

The system 1000 may also include one or more communication modules 1012. The communication module 1012 may be operable to facilitate communication between the system 1000 and one or more networks, and/or with one or more devices through a variety of possible standard or proprietary communication protocols (e.g. via Bluetooth, Near Field Communication (NFC), Cellular communication, etc.).

As used here, a "computer-readable medium" includes one or more of any suitable media for storing the executable instructions of a computer program such that the instruction execution machine, system, apparatus, or device may read (or fetch) the instructions from the computer readable medium and execute the instructions for carrying out the described methods. Suitable storage formats include one or more of an electronic, magnetic, optical, and electromagnetic format. A non-exhaustive list of conventional exemplary computer readable medium includes: a portable computer diskette; a RAM; a ROM; an erasable programmable read only memory (EPROM or flash memory); optical storage devices, including a portable compact disc (CD), a portable digital video disc (DVD), a high definition DVD (HD-DVD™), a BLU-RAY disc; and the like.

It should be understood that the arrangement of components illustrated in the Figures described are exemplary and that other arrangements are possible. It should also be understood that the various system components (and means) defined by the claims, described below, and illustrated in the various block diagrams represent logical components in some systems configured according to the subject matter disclosed herein.

For example, one or more of these system components (and means) may be realized, in whole or in part, by at least some of the components illustrated in the arrangements illustrated in the described Figures. In addition, while at least one of these components are implemented at least partially as an electronic hardware component, and therefore constitutes a machine, the other components may be implemented in software that when included in an execution environment constitutes a machine, hardware, or a combination of software and hardware.

More particularly, at least one component defined by the claims is implemented at least partially as an electronic hardware component, such as an instruction execution machine (e.g., a processor-based or processor-containing machine) and/or as specialized circuits or circuitry (e.g., discreet logic gates interconnected to perform a specialized function). Other components may be implemented in software, hardware, or a combination of software and hardware. Moreover, some or all of these other components may be combined, some may be omitted altogether, and additional components may be added while still achieving the functionality described herein. Thus, the subject matter described herein may be embodied in many different variations, and all such variations are contemplated to be within the scope of what is claimed.

In the description above, the subject matter is described with reference to acts and symbolic representations of operations that are performed by one or more devices, unless indicated otherwise. As such, it will be understood that such acts and operations, which are at times referred to as being computer-executed, include the manipulation by the processor of data in a structured form. This manipulation transforms the data or maintains it at locations in the memory system of the computer, which reconfigures or otherwise alters the operation of the device in a manner well understood by those skilled in the art. The data is maintained at physical locations of the memory as data structures that have particular properties defined by the format of the data. However, while the subject matter is being described in the foregoing context, it is not meant to be limiting as those of skill in the art will appreciate that several of the acts and operations described hereinafter may also be implemented in hardware.

To facilitate an understanding of the subject matter described herein, many aspects are described in terms of sequences of actions. At least one of these aspects defined by the claims is performed by an electronic hardware component. For example, it will be recognized that the various actions may be performed by specialized circuits or circuitry, by program instructions being executed by one or more processors, or by a combination of both. The description herein of any sequence of actions is not intended to imply that the specific order described for performing that sequence must be followed. All methods described herein may be performed in any suitable order unless otherwise indicated herein or otherwise clearly contradicted by context The use of the terms "a" and "an" and "the" and similar referents in the context of describing the subject matter (particularly in the context of the following claims) are to be construed to cover both the singular and the plural, unless otherwise indicated herein or clearly contradicted by context. Recitation of ranges of values herein are merely intended to serve as a shorthand method of referring individually to each separate value falling within the range, unless otherwise indicated herein, and each separate value is incorporated into the specification as if it were individually recited herein. Furthermore, the foregoing description is for the purpose of illustration only, and not for the purpose of limitation, as the scope of protection sought is defined by the claims as set forth hereinafter together with any equivalents thereof entitled to. The use of any and all examples, or exemplary language (e.g., "such as") provided herein, is intended merely to better illustrate the subject matter and does not pose a limitation on the scope of the subject matter unless otherwise claimed. The use of the term "based on" and other like phrases indicating a condition for bringing about a result, both in the claims and in the written description, is not intended to foreclose any other conditions that bring about that result. No language in the specification should be construed as indicating any non-claimed element as essential to the practice of the invention as claimed.

The embodiments described herein included the one or more modes known to the inventor for carrying out the claimed subject matter. Of course, variations of those embodiments will become apparent to those of ordinary skill in the art upon reading the foregoing description. The inventor expects skilled artisans to employ such variations as appropriate, and the inventor intends for the claimed subject matter to be practiced otherwise than as specifically described herein. Accordingly, this claimed subject matter includes all modifications and equivalents of the subject matter recited in the claims appended hereto as permitted by applicable law. Moreover, any combination of the above-described elements in all possible variations thereof is encompassed unless otherwise indicated herein or otherwise clearly contradicted by context.

While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

What is claimed is:

1. An automation command and control system, comprising:
    a memory storing computer instructions; and
    a processor that executes the computer instructions to perform a method comprising:
        storing information associated with a plurality of heterogeneous software robots, the plurality of heterogeneous software robots having access to a plurality of different heterogeneous applications;
        storing a plurality of scripts that are configured to use the plurality of heterogeneous software robots to automate a plurality of business processes associated with the plurality of different heterogeneous applications, the plurality of scripts including:
            simple scripts that involve a single heterogeneous software robot of the plurality of heterogeneous software robots, and
            complex scripts that involve two or more heterogeneous software robots of the plurality of heterogeneous software robots;
        storing a plurality of triggers corresponding to the plurality of scripts, the plurality of triggers including rule-based triggers and event-based triggers;
        responsive to detection of a first trigger of the plurality of triggers that corresponds to a first script of the plurality of scripts which is a complex script that automates a first business process of the plurality of business processes:
            assigning two or more select heterogeneous software robots of the plurality of heterogeneous software robots to respective tasks of the first business process, and
            launching the first script of the plurality of scripts to automate the first business process by causing each select heterogeneous software robot of the two or more select heterogeneous software robots to perform the respective task in association with a corresponding heterogeneous application of the plurality of different heterogeneous applications;
        monitoring a status of the automation of the first script to detect a failure;
        detecting the failure, based on the monitoring; and
        restarting the first script responsive to the detection of the failure.

2. The system of claim 1, wherein the system collects information from the plurality of robots running automation processes.

3. The system of claim 2, wherein the system analyzes the information from the plurality of robots running the automation processes.

4. The system of claim 3, wherein the system manages the plurality of robots running the automation processes based on the analyzed information.

5. The system of claim 1, wherein the system measures the load on a source application or a target application to prevent overloads.

6. The system of claim 1, wherein the system enables elastic robots activation based on business needs.

7. The system of claim 1, wherein the system is adapted to enable the adding of intelligent behavior using machine learning and artificial intelligence algorithms.

8. The system of claim 1, wherein the system is integrated with multiple channels including chat and voice.

9. A method, comprising:
    storing information associated with a plurality of heterogeneous software robots, the plurality of heterogeneous software robots having access to a plurality of different heterogeneous applications;
    storing information associated with a plurality of heterogeneous software robots, the plurality of heterogeneous software robots having access to a plurality of different heterogeneous applications;
    storing a plurality of scripts that are configured to use the plurality of heterogeneous software robots to automate a plurality of business processes associated with the plurality of different heterogeneous applications, the plurality of scripts including:
        simple scripts that involve a single heterogeneous software robot of the plurality of heterogeneous software robots, and
        complex scripts that involve two or more heterogeneous software robots of the plurality of heterogeneous software robots;
    storing a plurality of triggers corresponding to the plurality of scripts, the plurality of triggers including rule-based triggers and event-based triggers;

responsive to detection of a first trigger of the plurality of triggers that corresponds to a first script of the plurality of scripts which is a complex script that automates a first business process of the plurality of business processes:

assigning two or more select heterogeneous software robots of the plurality of heterogeneous software robots to respective tasks of the first business process, and launching the first script of the plurality of scripts to automate the first business process by causing each select heterogeneous software robot of the two or more select heterogeneous software robots to perform the respective task in association with a corresponding heterogeneous application of the plurality of different heterogeneous applications;

monitoring a status of the automation of the first script to detect a failure;

detecting the failure, based on the monitoring; and restarting the first script responsive to the detection of the failure.

10. A computer program product embodied on a non-transitory computer readable medium, comprising computer code for:

storing information associated with a plurality of heterogeneous software robots, the plurality of heterogeneous software robots having access to a plurality of different heterogeneous applications;

storing a plurality of scripts that are configured to use the plurality of heterogeneous software robots to automate a plurality of business processes associated with the plurality of different heterogeneous applications, the plurality of scripts including:

simple scripts that involve a single heterogeneous software robot of the plurality of heterogeneous software robots, and complex scripts that involve two or more heterogeneous software robots of the plurality of heterogeneous software robots;

storing a plurality of triggers corresponding to the plurality of scripts, the plurality of triggers including rule-based triggers and event-based triggers;

responsive to detection of a first trigger of the plurality of triggers that corresponds to a first script of the plurality of scripts which is a complex script that automates a first business process of the plurality of business processes:

assigning two or more select heterogeneous software robots of the plurality of heterogeneous software robots to respective tasks of the first business process, and launching the first script of the plurality of scripts to automate the first business process by causing each select heterogeneous software robot of the two or more select heterogeneous software robots to perform the respective task in association with a corresponding heterogeneous application of the plurality of different heterogeneous applications;

monitoring a status of the automation of the first script to detect a failure;

detecting the failure, based on the monitoring; and restarting the first script responsive to the detection of the failure.

11. The system of claim 1, the method further comprising:

analyzing the plurality of scripts and applying machine learning to improve performance, wherein performance is improved by optimizing target system loads, eliminating unnecessary steps, and redesigning a flow.

12. The system of claim 1, wherein the corresponding heterogeneous applications on which the respective tasks are performed are associated with multiple systems such that the business process spans the multiple systems.

13. The system of claim 1, wherein the respective tasks are a same task executed using multiple different interfaces to the corresponding heterogeneous applications.

14. The system of claim 13, wherein the multiple different interfaces include on screen, an application programming interface (API), and a database.

* * * * *